United States Patent
Shqau et al.

(10) Patent No.: US 8,337,588 B2
(45) Date of Patent: Dec. 25, 2012

(54) MODIFIED ZEOLITE Y MEMBRANES FOR HIGH-PERFORMANCE CO$_2$ SEPARATION

(75) Inventors: Krenar Shqau, Columbus, OH (US);
Jeremy C. White, Columbus, OH (US);
Prabir K. Dutta, Worthington, OH (US); Hendrik Verweij, Upper Arlington, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 331 days.

(21) Appl. No.: 12/758,476

(22) Filed: Apr. 12, 2010

(65) Prior Publication Data
US 2011/0247492 A1  Oct. 13, 2011

(51) Int. Cl.
*B01D 53/22* (2006.01)
*B01J 29/08* (2006.01)
(52) U.S. Cl. ............... 95/51; 95/45; 96/4; 96/11; 502/4; 502/62; 502/79
(58) Field of Classification Search ............... 95/45, 51; 96/4, 11; 210/640, 500.21, 500.22; 502/4, 502/62, 79
See application file for complete search history.

(56) References Cited

U.S. PATENT DOCUMENTS

| | | | | |
|---|---|---|---|---|
| 5,378,440 A | * | 1/1995 | Herbst et al. | 96/4 |
| 5,753,121 A | * | 5/1998 | Geus et al. | 96/11 |
| 6,090,289 A | * | 7/2000 | Verduijn et al. | 96/11 |
| 6,193,784 B1 | * | 2/2001 | Yazawa et al. | 95/45 |
| 2010/0116130 A1 | * | 5/2010 | Carreon et al. | 95/45 |
| 2012/0006194 A1 | * | 1/2012 | Falconer et al. | 95/51 |

OTHER PUBLICATIONS

Brett A. Holmberg, et al., "Controlling size and yield of zeolite Y nanocrystals using tetramethylammonium bromide," Microporous and Mesoporous Material, vol. 59 (2003) pp. 13-28.

Svetlana Mintova, et al., "Electron Microscopy Reveals the Nucleation Mechanism of Zeolite Y from Precursor Colloids," Angew. Chem. Int. Ed 1999, vol. 38, No. 21, pp. 3201-3204.

Qinghua Li, et al., "An Investigation of the Nucleation/Crystallization Kinetics of Nanosized Colloidal Faujasite Zeolites," Chem. Matter 2002, vol. 14, pp. 1319-1324.

Vladimiros Nikolakis et al., "Growth of a faujasite-type zeolite membrane and its application in the separation of saturated/unsaturated hydrocarbon mixtures," Journal of Membrane Science, vol. 184 (2001) pp. 209-219.

M.L. Mottern et al., "Thin supported inorganic membranes for energy-related gas and water purification," International Journal of Hydrogen Energy, vol. 32 (2007), pp. 3713-3723.

Yanghee Kim et al., "An Integrated Zeolite Membrane/RuO2 Photocatalyst System for Hydrogen Production from Water," J. Phys. Chem, C 2007, vol. 111, pp. 10575-10581.

Yanghee Kim et al., "Photochemical studies with a zeolite Y membrane formed via secondary growth," Res. Chem. Intermed., vol. 30, No. 2, pp. 147-161 (2004).

Izumi Kumakiri, et al., "Preparation of Zeolite A and Faujasite Membranes from a Clear Solution", Ind. Eng. Chem. Res. 1999, vol. 38, pp. 4682-4688.

(Continued)

*Primary Examiner* — Jason M Greene
(74) *Attorney, Agent, or Firm* — Calfee, Halter & Griswold, LLP

(57) ABSTRACT

Supported zeolite Y membranes exhibiting exceptionally high CO2 selectivities when used in CO$_2$/N$_2$ gas separations are produced by a seeding/secondary (hypothermal) growth approach in which a structure directing agent such as tetramethylammonium hydroxide is included in the aqueous crystal-growing composition used for membrane formation.

20 Claims, 7 Drawing Sheets

Diagram of the mixed gas separation setup.

OTHER PUBLICATIONS

Xuehong Gu et al., "Synthesis of Defect-Free FAU-Type Zeolite Membranes and Separation for Dry and Moist CO2/N2 Mixtures," Ind. Eng. Chem. Res. 2005, vol. 44, pp. 937-944.

Yashuhi Hasegawa et al., "Effect of temperature on the gas permeation properties of NaY-type zeolite formed on the inner surface of a porous support tube," Chemical Engineering Science 56 (2001) pp. 4273-4281.

Hyunjung Lee et al., "Charge Transport through a Novel Zeolite Y Membrane by a Self-Exchange Process," J. Phys. Chem. B 2002, vol. 106, pp. 11898-11904.

Guillaume Clet, et al., "An Alternative synthesis method for Zeolite Y Membranes," Chem, Community, 2001. pp. 41-42.

K. Kusakabe, et al., "Gas Permeation Properties of Ion-Exchanged Faujasite-Type Zeolite Membranes," AlChe Journal, Jun. 1999, vol. 45, No. 6, pp. 1220-1226.

E.E. McLeary et al., "Zeolite based films, membranes and membrane reactors: Progress and Prospects," Microporous and Mesoporous Materials 90 (2006), pp. 198-220.

W.J. Koros et al., "Terminology for Membranes and Membrane Processes," Pure & Appl Chem., vol. 68, No. 7, 1996 pp. 1479-1489.

H. Verweij, "Ceramic membranes: Morphology and transport," Journal of Materials Science 38 (2003), pp. 4677-4695.

Yasuhisa Hasegawa, "The separation of CO2 using Y-type zeolite membranes ion-exchanged with alkali metal cations," Separation and Purification Technology 22-23 (2001) pp. 319-325.

Yanghee Kim, "Zeolite Membrane-Based Artificial Photosynthetic Assembly for Long-Lived Charge Separation," The Journal of Physical Chemistry B Letters, 2005, 109, pp. 6929-6932.

Joaquin Coronas, et al., "Separations of C4 and C6 Isomers in ZSM-5 Tubular Membranes," Ind. Eng. Chem.Res. 1998,vol. 37, pp. 166-176.

Catherine L. Flanders, et al., "Separation of C6 isomers by vapor permeation and pervaporation through ZSM-5 membranes," Journal of Membrane Science 176 (2000) pp. 43-53.

Christopher J. Gump, et al., "Separation of Hexane Isomers through Nonzeolite Pores in ZSM-5 Zeolite Membranes," Ind. Eng. Chem, Res. 1999, vol. 38, pp. 2775-2781.

Katsuki Kusakabe, et al., "Separation of carbon dioxide from nitrogen using ion-exchanged faujasite-type zeolite membranes formed on porous support tubes," Journal of Membrane Science, 148 (1998), pp. 13-23.

Takahiro Seike, et al., "Preparation of FAU type zeolite membranes by electrophoretic deposition and their separation properties," J. Mater. Chem., 2002, vol. 12, pp. 366-368.

Zhilin Cheng, et al., "Novel synthesis of FAU-type zeolite membrane with high performance," Chem. Commun., 2004, pp. 1718-1719.

Yasuhisa Hasegawa, et al., "Influence of alkali cations on permeation properties of Y-Type zeolite membranes," Journal of Membrane Science, 208 (2002), pp. 415-418.

Xuehong Gu, et al., Synthesis of Defect-Free FAU-Type Zeolite Membranes and Separation for Dry and Moist CO2/N2 Mixtures,: Ind. Eng. Chem. Res., 2005, vol. 44, pp. 937-944.

Florent Guillou, et al., "Synthesis of FAU-type zeolite membrane: An original in situ process focusing on the rheological control of gel-like precursor species," Microporous and Mesoporous Materials, 119 (2009), pp. 1-8.

Fangrui Qiu, et al., "Preparation and properties of TS-1 zeolite and film using Sil-1 nanoparticles as seeds," Chemical Engineering Journal 147 (2009), pp. 316-322.

Dutta, P.K and Payra P, "In Handbook of Zeolite Science and Technology," Marcel Dekker, Inc., New York, 2003, pp. 1-19.

Sankar Nair, et al., "Synthesis and Properties of Zeolitic Membranes," pp. 867-919, known prior art.

Yasuhisa Hasegawa, et al., "Effect of temperature on the gas permeation properties of NaY-type zeolite formed on the inner surface of a porous support tube," Chemical Engineering Science 56 (2001) pp. 4273-4281.

Shigeyuki Uemiya, et al., "Microstructures formed by secondary growth of fired ZSM-5 seed crystals," J. Porous Matter (2008) 15, pp. 405-410.

Qinghua Li, et al., "An Investigation of the Nucleation/Crystallization Kinetics of Nanosized Colloidal Faujasite Zeolites," Chem. Mater. 2002, vol. 14, pp. 1319-1324.

Taisiana A. Kuzniatsova et al., "Synthesis of Thin, Oriented Zeolite A Membranes on a Macroporous Support," Adv. Funct. Mater, 2008, vol. 18, pp. 952-958.

Jonas Hedlund et al., "Permporometry analysis of zeolite membranes," Journal of Membrane Science 345 (2009), pp. 276-287.

E. Spinner, "Raman-spectral depolorisation ratios of ions of concentrated aqueous solution. The next-to-negligible effect of highly asymmetric ion surroundings on the symetry properties of polarisability changes during vibrations of symmetric ions. Ammonium sulphate and tetramethylammonium bromide," Spectrochimica Acta Part A 59 (2003) pp. 1441-1456.

Katsuki Kusakabe et al., "Formation of a Y-Type Zeolite Membrane on a Porous a-Alumina Tube for Gas Separation," Ind. Eng. Chem. Res. 1997, vol. 36, pp. 649-655.

Shuang Li, "TEM Investigation of Formation Mechanism of Monocrystal-Thick b-Oriented Pure Silica Zeolite MFI Film," J. Am. Chem. Soc. 2004, vol. 126, pp. 10732-10737.

Krenar Shqua et al., "Preparation and Properties of porous a-Al2O3 Membrane Supports," J. Am. Ceram. Soc., 89 [6], pp. 1790-1794, (2006).

Jeremy White, et al., "Synthesis of zeolite L membranes with submicron to micron thicknesses," Microporous and Mesoporous Materials 115 (2008), pp. 389-398.

* cited by examiner

Figure 2: SEM image of (a) top view and (b) cross-section of sub-micron zeolite Y seed layer using 5 mg/mL zeolite concentration.

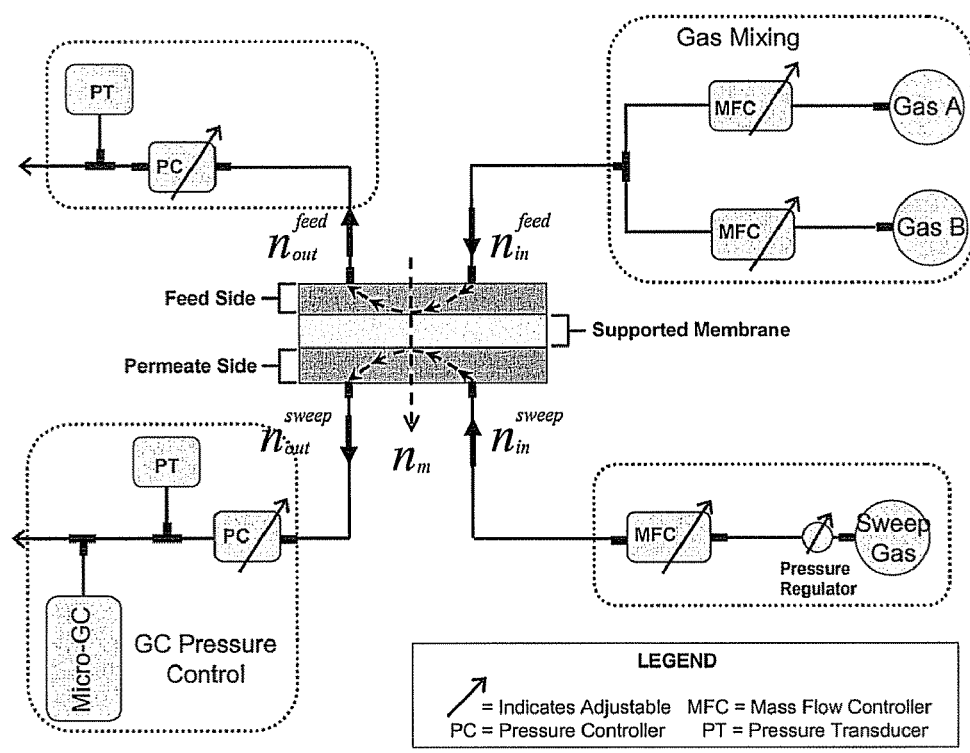
Figure 6: Diagram of the mixed gas separation setup.

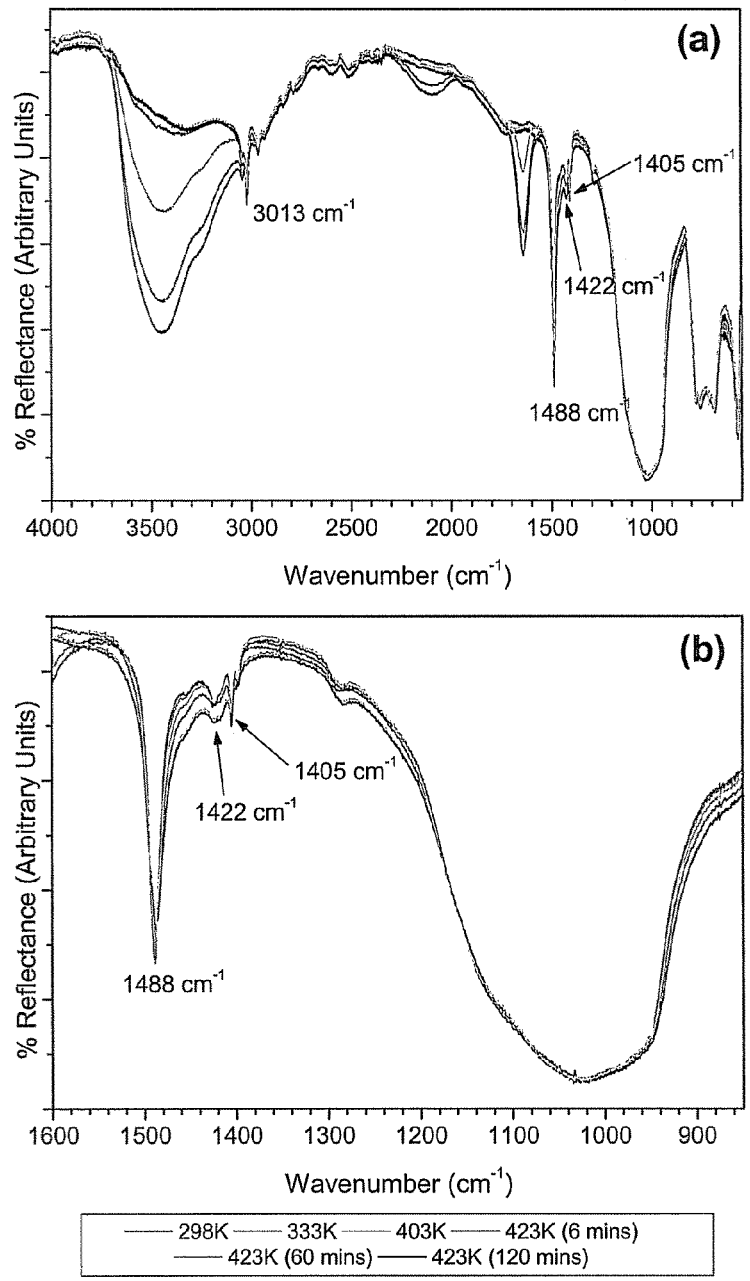
Figure 7: DRIFTS spectra monitoring the in-situ decomposition of TMA in sub-micron zeolite Y at 423K.

MODIFIED ZEOLITE Y MEMBRANES FOR HIGH-PERFORMANCE $CO_2$ SEPARATION

FEDERALLY SPONSORED RESEARCH

The work described here was supported by The Basic Research for the Hydrogen Fuel Initiative Program (DOE, grant No. DF-FG01-04FR04-20). The Federal Government may have certain rights in this work.

BACKGROUND

Supported zeolite membranes with controlled microstructures are important in applications as diverse as catalysis, ion-exchange, nuclear waste disposal, light harvesting devices, chemical sensing and gas separations.[1-3] Over the past two decades, membranes of various zeolite structure types, formed on inorganic porous supports have shown enormous potential for separations of gas and liquid mixtures.

$CO_2$ separation is one of the most studied applications for zeolite Y membranes because of its industrial significance, such as $CO_2$ capture for carbon sequestration, natural gas purification, and separation of product streams from water gas shift reactions for hydrogen production.[7-11] Due to the window size (0.73 nm) of the pores or "supercages" defined by the molecular superstructure of the zeolite Y, there is no steric hindrance for molecules, like $CO_2$, $CH_4$, CO, $H_2O$ or $N_2$, to enter in the pores. However, for molecules like $CO_2$, there is preferential interaction with the aluminosilicate framework and the extra framework cations which leads to a favorable combination of sorption and mobility. Thus, with gas mixtures containing $CO_2$, and $N_2$ or $CH_4$, the $CO_2$ permeates preferentially through the zeolite by surface diffusion, while $N_2$ ($CH_4$) is excluded from the faujasite pores due to preferential $CO_2$ adsorption and pore constriction.[8,10]

Significant progress has been made in the synthesis of zeolite Y membranes. For example, much prior work has focused on the seeding and secondary growth processes, i.e., processes in which zeolite seed crystals are deposited on a porous substrate followed by growing the seed crystals into a coherent zeolite membrane.[17,20] The influence of chemical composition on the particle size of zeolite Y seed crystals has also been studied.[21-24] Nonetheless, issues that remain include reproducibility of membrane synthesis, control of defects, and development of membranes highly selective for $CO_2$ separation.

SUMMARY OF THE INVENTION

In accordance with this invention, it has been found that zeolite Y membranes exhibiting exceptionally high selectivities for $CO_2$ separation, as well as high $CO_2$ permeance, can be produced by typical seeding and secondary growth processes, provided that (1) a structure directing agent (SDA) such as a tetramethylammonium compound (TMA) is included in the aqueous composition used for growing the membrane and (2) the membrane is thereafter dried under conditions which leave at least some of the SDA that inherently remains in the membrane as a result of the membrane growing process substantially in place.

Thus, this invention provides a process for producing a supported zeolite Y membrane for use in a gas separation procedure in which zeolite Y seed crystals previously deposited onto a porous support are grown into a coherent zeolite Y membrane by contact with a zeolite-growing aqueous composition and the coherent zeolite Y membrane so formed is then dried, wherein the zeolite-growing aqueous composition contains a structure directing agent capable of promoting the formation of zeolite Y, and further wherein drying of the coherent zeolite Y membrane is done under conditions which allow at least some of the structure directing agent that is present in the membrane when formed to remain in the membrane after drying is completed.

In addition, this invention also provides a dried supported zeolite Y membrane for use in a gas separation procedure, the supported membrane comprising a porous support and a coherent zeolite Y membrane on the support, the membrane being produced by a seeding/secondary crystal growing process in which zeolite Y seed crystals previously deposited onto a porous support are grown into a coherent zeolite Y membrane by contact with a zeolite-growing aqueous composition and the coherent zeolite Y membrane so formed is then dried, wherein the zeolite-growing aqueous composition contains a structure directing agent capable of promoting the formation of zeolite Y and further wherein drying of the coherent zeolite Y membrane is done under conditions which are insufficient to drive off all of the structure directing agent that may be present in the membrane when formed so that that the supported zeolite Y membrane ultimately obtained after drying is completed contains sufficient structure directing agent to improve the membrane's gas separation properties.

In addition, this invention further provides a process for producing a supported zeolite Y membrane comprising a zeolite Y membrane carried on a porous support, the process comprising depositing zeolite Y seed crystals onto the porous support and then growing the seed crystals into a coherent zeolite Y membrane by contacting the zeolite Y seed crystals with a zeolite-growing aqueous composition, wherein the aqueous growing composition contains a structure directing agent comprising a tetramethylammonium compound.

In addition, this invention still further provides a process for separating a gas mixture into its component parts, especially for separating $CO_2$ from a mixture of $CO_2$ and $N_2$, comprising contacting the gas mixture with one of the above dried supported zeolite Y membranes.

BRIEF DESCRIPTION OF THE DRAWINGS

This invention may be more readily understood by reference to the following drawings wherein:

FIG. 6. is a schematic illustration of the apparatus used to conduct the mixed gas separation experiments described in some of the following working examples; and FIG. 7 is a DRIFTS spectra illustrating the absence of in-situ decomposition of the particular SDA used in these working examples (tetramethylammonium hydroxide) which remains in a supported zeolite Y membrane produced in accordance with this invention when this membrane is heated to drying under various different heating regimens.

DETAILED DESCRIPTION

Figure 1:
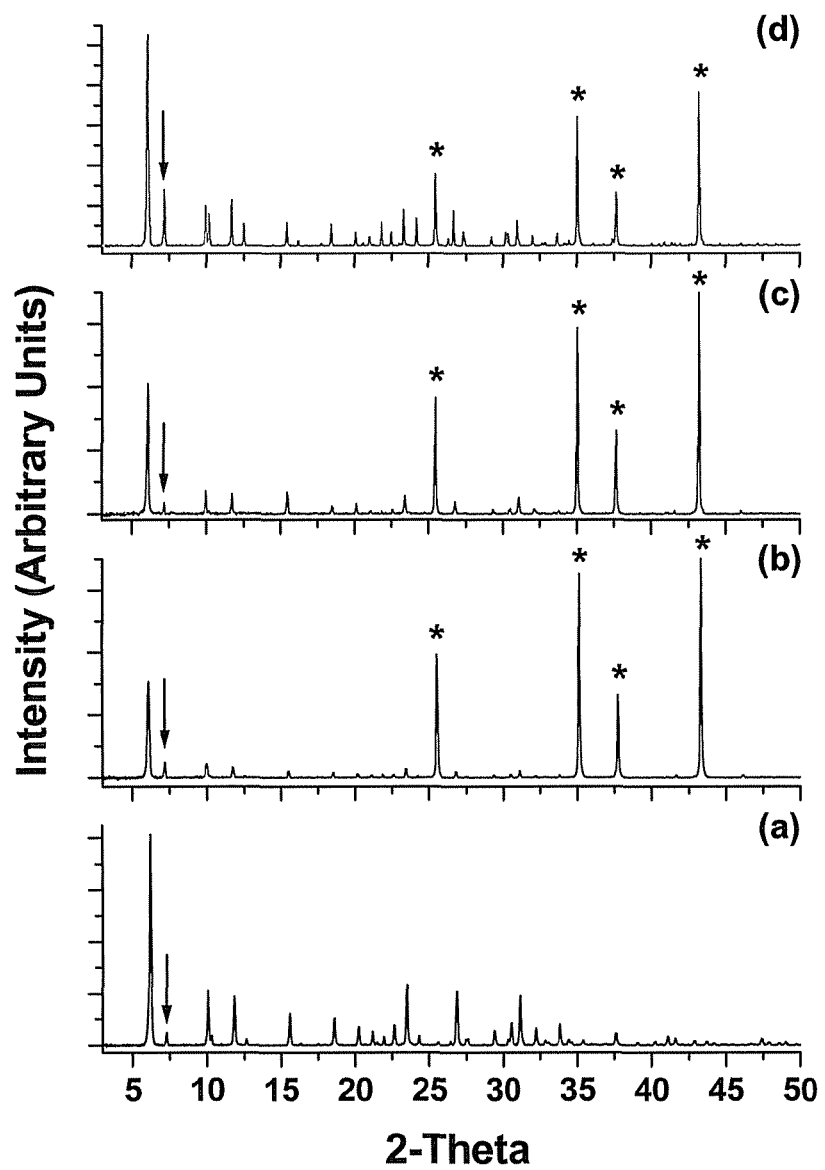
FIGS. 1(a), 1(b), 1(c) and 1(d) are X-ray diffraction patterns of (a) the zeolite Y seed crystals used in the following working examples to form a supported zeolite Y membrane of this invention (b) these same zeolite Y seed crystals after being deposited on a porous alumina support, (c) the zeolite Y membrane produced by growing a zeolite Y membrane according to an approach which is similar to yet different from this invention, and (d) the zeolite Y membrane of this invention.

In accordance with this invention, a structure directing agent is included in the aqueous crystal-growing composition used for secondary crystal growing in a seed crystal/secondary growing approach for producing supported zeolite Y membranes. As a result, the supported zeolite Y membrane ultimately produced exhibits exceptionally high selectivities for $CO_2$ separation, as well as high $CO_2$ permeance, in $CO_2$ gas separation processes, provided that the membrane is dried under conditions which leave at least some of the SDA inherently remaining in the membrane as a result of the secondary crystal growing procedure substantially in place.

Supported Zeolite Y Membranes

Supported zeolite Y membranes, as well as their use in gas separation and many other processes, are well known and described in a variety of different publications and other documents. Examples include Gu et al., Synthesis of Defect-Free FAU-Type Zeolite Membranes and Separation for Dry and Moist $CO_2/N_2$ Mixtures, *Ind. Eng. Chem. Res.* 2005, 44, 937, and Kumakiri et al., Preparation of Zeolite A and Faujasite Membranes for a Clear Solution, *Ind. Eng. Chem. Res.* 1999, 38, 4682.

Generally speaking supported zeolite Y membranes comprise a porous support such as alumina, other ceramics or organic polymers which carries a zeolite Y membrane produced in situ by a crystal growing technique in which zeolite Y seed crystals previously deposited on the porous support are contacted with a zeolite-growing aqueous composition. The zeolite-growing aqueous composition contains silica, alumina (and/or precursors thereof) as well as other desirable ingredients and adjuvants which, in the aggregate, will cause additional amounts of zeolite Y to grow from the seed crystals, thereby producing larger product zeolite Y crystals. Such processes are generally referred to as "secondary" or "hydrothermal" crystal growing techniques. Provided that the seed crystals are closely packed enough on the support, the grown product crystals form a continuous, coherent, essentially pinhole-free membrane composed of zeolite Y. "Pinholes" in this context refers to holes or openings spanning the thickness of the membrane having diameters of >~2 nm. As well-appreciated in the art, such pinholes are desirably avoided as the adversely affect the separation capabilities of the membranes ultimately obtained.

In carrying out this invention, any porous support that has previously been used or which may be used in the future for forming supported zeolite Y membranes can be used as the porous supports in carrying out this invention. Examples include, but are not limited to alumina, other ceramics and organic polymers. Moreover, such porous supports can have any geometry such as flat or tubular, depending on the application. The pore size of the pores in these porous supports is not critical, and any pore size which has been effective in the past, or which becomes effective in the future, for forming supported zeolite Y membranes useful in gas separations can be selected as pore size of the porous supports used in this invention. For example, pore sizes as small as 20 nm and as large as 400 nm can be used, although pore sizes. Pores sizes on the order of 40 nm to 100 nm, and especially 50 nm to 60 nm, have been found to work well in many applications.

In the same way, any zeolite Y seed crystals that have previously been used or which may be used in the future for growing supported zeolite Y membranes can be used as the zeolite Y seed crystal in carrying out this invention. In this regard, it is well understood in crystallography that two competing phenomena occur in a typical crystal growing process (1) growing of additional amounts of crystal on the seed crystal "substrates" by a heterogeneous nucleation process and (2) dissolution of the seed crystals by the liquid forming the crystal growing composition. In addition, it is also known that the rates at which these competing phenomena occur may be different from one another at different times during the crystal-growing procedure, e.g., nucleation vs. growth, and also that the rate these different phenomena occur vary independently depending on the specific chemistries of the system. For this reason, it is also known that care must be taken in selecting the particular seed crystals and particular crystal-growing composition to be used in a particular crystal growing procedure to choose seed crystals which are large enough so that they will avoid being totally dissolved in the liquid forming the crystal growing composition.

The same considerations apply in carrying out this invention in the sense that care must be taken in selecting the particle size of the seed crystals used in a particular embodiment of this invention to choose a particle size which is large enough to avoid complete dissolution of the seed crystals before the crystal growing reaction begins in earnest. Since this trade-off between rates of crystal growth and seed crystal dissolution as well as effective ways of dealing with this trade-off are well known, those skilled in the art should have no difficulty in choosing particular particles sizes for the seed crystals to be used in particular embodiments of this invention.

As illustrated in the following working examples, it is preferable in carrying out at least some embodiments of this invention that the average particle size of the zeolite Y seed crystals be at least about 50 nm and no more than about 500 nm. If the particle size is too small, then the particles may completely dissolve in the liquid forming the crystal growing composition, as further discussed below. If the particle size is too large, then the seed layer as well as the membrane ultimately produced will be thicker than desired. In this connection, it is well appreciated in the art that the zeolite Y membranes obtained are desirably as thin as possible, typically ≦~1 nm thick at least for gas separation applications, since membrane thickness directly impacts permeance. More typical particle sizes are 60 nm to 200 nm or even 75 nm to 150 nm.

Any zeolite-growing aqueous composition that has previously been used or which may be used in the future for growing supported zeolite Y membranes can also be used as the zeolite-growing aqueous composition in carrying out this invention. As well known in the art, such zeolite-growing aqueous composition typically contain an alumina source such as aluminum hydroxide, aluminum nitrate, aluminum chloride or aluminum isopoxide, and a silica source such as colloidal silica (e.g., Ludox SM-30), sodium silicate or fused silica, with the aluminum/silicon molar ratio generally ranging from 0.02 to 1. In addition, such zeolite-growing aqueous compositions also typically contain additional optional ingredients such as NaOH, Na$_2$O or other source compounds for supply desirable cations such as Na, K and/or Cs to the system.

The inventive supported coherent essentially pinhole-free zeolite Y membranes are produced using the above zeolite-growing aqueous compositions in essentially the same way as conventional coherent zeolite Y membranes are produced using conventional zeolite-growing aqueous compositions, i.e., by allowing the zeolite Y seeds carried by the seeded porous support to remain in contact with the zeolite-growing aqueous composition at suitable (usually elevated) temperatures and other conditions for a period of time which is long enough to produce a product zeolite Y membrane layer of suitable thickness.

Structure Directing Agent

In accordance with this invention, the crystal-growing aqueous composition used to grow the zeolite Y membrane of this invention is formulated to include a structure directing agent (SDA). Structure directing agents are organic molecules which, when included in a crystal-growing composition, promote the formation of the particular crystal sought in the sense that crystal formation occurs faster, or a better crystal is obtained, or both relative to an otherwise identical crystal-growing composition not containing the structure directing agent. Generally speaking, structure directing agents useful for making zeolite Y can be described as organic molecules which are small enough to fit into the ~0.8 nm zeolite Y pores or "supercages" defined by the zeolite Y molecular superstructure.

Tetramethylammonium compounds (TMA), i.e., compounds which are composed of the tetramethylammonium cation and an appropriate anion such as OH$^-$, Br$^-$, Cl$^-$ and F, are of particular interest for use as structure directing agents in making zeolite Y. Other compounds known to function as structure directing agents for making zeolite Y include tetraethylammonium compounds, triethanolammonium compounds, phthalocyanines and metal complexes. Generally speaking, any compound which is already known, or which becomes known in the future, to function as a structure directing agent for making zeolite Y can be used as the structure directing agent in the secondary (hydrothermal) aqueous crystal growing compositions of this invention.

Using SDA's in general, and TMA's in particular, to aid in the nucleation and subsequent formation of discrete zeolite Y crystals is well known and described in many publications. See, for example, Holmberg et al., Controlling the size and yield of zeolite Y nanocrystals using tetramethylammonium bromide, Microporous *Mesoporous Mater.* 2003, 59, 13; Mintova et al., Electron Microscopy Reveals the Nucleation Mechanism of Zeolite Y from Precursor Colloids, *Angew. Chem. Int. Ed.* 1999, 38, 3201; and Li et al., An Investigation of the Nucleation/Crystallization Kinetics of Nanosized Colloidal Faujasite Zeolites, *Chem. Mater.* 2002, 14, 1319.

Moreover, at least one publication, Nicolakis et al., Growth of a faujasite-type zeolite membrane and its application in the separation of saturated/unsaturated hydrocarbon mixtures, *Jour. of Membrane Science,* 2001, 184, 209, describes a process in which an SDA, in particular triethanol ammonium hydroxide (TEAOH), is included in the secondary (hydrothermal) crystal-growing composition used for producing a zeolite Y membrane that is useful for separating unsaturated hydrocarbons from saturated and hydrocarbons. However, this reference is clear that this SDA must be completely removed from the membrane by heating to 723° K (450° C.) for 5 hours before it can be used for separation procedures. The present invention departs from these earlier approaches in that, in this invention, not only is an SDA included in the secondary (hydrothermal) crystal-growing composition used for producing the product zeolite Y membrane from seed crystals but, in addition, this SDA (or at least some portion of this SDA) is left in the membrane ultimately produced so that this SDA remains present in the membrane when it is used for subsequent gas separation and other procedures.

In accordance with this invention, it has been found that supported zeolite Y membranes which are made in this way, i.e., by forming and treating the membrane in such a way that an SDA is present in the membrane when subsequently used for separation purposes, exhibit exceptionally high selectivities for CO$_2$ separation, as well as high CO$_2$ permeance, when used in CO$_2$/N$_2$ gas separations. In particular, it has been found that the pores or "supercages" of the zeolite Y membranes made by including such an SDA in the aqueous secondary crystal growing composition inherently retain a significant amount of this SDA and further that the presence of this SDA in subsequent gas separation processes materially improves the performance of these membranes.

For example, the following working examples illustrate that, in particular embodiments of this invention in which TMA is used as the SDA, about 25% of the "supercage" volume of the supported zeolite Y membrane ultimately produced remains occupied with this TMA. In addition, these working examples further show that, when the membrane so obtained is used for CO$_2$/N$_2$ gas separation after being dried under suitable conditions, the CO$_2$ selectivities obtained are exceptionally high ($\alpha_{CO2/N2}$>500) even at high CO$_2$ permeance (0.96×10$^{-7}$ mol/m$^2$ s Pa).

In this regard, supported zeolite Y membranes normally need to be at least partially dried before they exhibit any substantial gas separating capability. Accordingly, "drying" in the context of this document will be understood to mean a treatment which reduces the water content of a supported zeolite Y membrane enough so that it will exhibit significant gas separation capability. It does not mean or connote that the membrane must be completely dried. Typically, drying is done by heating the membrane at elevated temperature, e.g., 275° K-500° K, for 1 to 24 hours.

In accordance with a further aspect of this invention, it has been found that this drying operation should be accomplished in a such way that at least some of the SDA inherently retained in the "supercages" of the zeolite Y membrane ultimately produced is retained in the membrane when ultimately used for gas separation purposes. In the embodiments of this invention described in the following working examples, the membrane is dried under fairly mild conditions (e.g., 298° K to 423° K for 1 to 24 hours) which leaves substantially all of the particular SDA used, TMA, in place after the drying operation in completed. In this case, about 25% of the "supercage" volume of the supported zeolite Y membrane obtained remains occupied with this TMA.

More vigorous drying conditions can be used in other embodiments of this invention, to the extent that some or even all of the residual SDA is decomposed or otherwise driven from the product zeolite Y membrane before use. However, at least for membranes intended for use in gas separation applications, it is desirable that drying being accomplished under conditions which leave a significant amount, i.e., at least about 10% and in some instances at least about 20%, at least about 30%, at least about 40%, at least about 50%, at least about 60%, at least about 70%, at least about 80%, and even at least about 90%, of the SDA originally in the membranes as produced in these membranes after drying is completed. This means that as little as about 2% and as much as about 25% or more of the volume of the zeolite Y supercages will be occupied with residual SDA. Thus, embodiments of this invention in which the amount of SDA remaining in these supercages is at least about 5 vol % of the total volume of these supercages are contemplated, as are embodiments in which the amount of SDA remaining in these supercages is at least about 10 vol %, at least about 15 vol. % and even at least about 20 vol. % of the total volume of these supercages are contemplated. The precise conditions needed to accomplish these levels of retained SDA can easily be determined by routine experimentation.

Drying regimens involving heating at temperatures of about 300° K to 650° K, more typically 340° K to 550° K, or even 363° K to 450° K for 6 to 48 hours, have found to be suitable when TMA is used as the SDA. Other suitable drying regimens for use when other SDA's are used can easily be determined by routine experimentation.

The amount of SDA that should be included in the aqueous crystal-growing compositions used in the inventive process can vary widely and essentially any amount can be used which will produce a noticeable improvement in membrane performance. For example, where the SDA is TMA and the alumina source is $Al_2O_3$, molar proportions of $SDA/Al_2O_3$ on the order of about 0.5:1 to about 20:1, more typically about 1:1 to about 15:1, about 2:1 to about 10:1, or even about 2.5:1 to about 4:1 can be used. Where different SDA's and alumina sources are used, corresponding molar ratios are appropriate.

WORKING EXAMPLES

In order to more thoroughly describe the subject matter of this invention, the following working examples are presented:

Materials

Aluminum hydroxide ($Al(OH)_3$, 80.5%) was purchased from Alfa Aesar, sodium hydroxide from Mallinckrodt (NaOH, 98.8%) and tetramethylammonium hydroxide (TMAOH, 25%) from SACHEM, Ludox SM-30 ($SiO_2$, 30%) and Dowex proton-exchange resin were obtained from Aldrich (Milwaukee, Wis., USA). All chemicals were used without further purification. The $H_2O$ used was purified by a Millipore ultrapure water system.

Synthesis

All zeolite precursor solutions described below were mixed in polypropylene bottles.

Sub-Micron Zeolite Y Seeds. Faujasite zeolite Y ranging from 80-200 nm in size were prepared from a clear solution with the following composition: $0.037Na_2O:1.0Al_2O_3:3.13 (TMA)_2O:4.29SiO_2:497H_2O$.[32,33] This precursor solution was prepared by thoroughly mixing 152 g $H_2O$, 4.58 g $Al(OH)_3$ and 53.6 g TMAOH and stirring for 2 hours. Meanwhile, 25 g Ludox SM-30 was adjusted to pH 8.1 using Dowex proton-exchange resin. After removal of the resin, 20 g of this silicate solution was added to the tetramethylammonium aluminate solution, followed by the addition of 30 mg of NaOH and stirring for 3 hours. The clear solution was placed into a 250 mL Nalgene bottle and heated using static conditions at 373° K for 4 days. The crystallites formed during this treatment were washed with water, followed by drying at 333° K overnight. The zeolites were then calcined at 823° K in flowing air for 24 hours to remove any TMA from the zeolite.

$\alpha$-$Al_2O_3$ Macro porous Supports. Detailed information about the macro-porous alumina supports, has been described elsewhere.[34] The supports were prepared by colloidal casting of a purified composition of Sumitomo AKP30 $\alpha$-$Al_2O_3$ particles, followed by drying and slight sintering at 1223° K. The $\alpha$-$Al_2O_3$ particle size was ~300 nm; the sintered supports had 30% porosity, a bulk pore size of ~80 nm and a surface pore size of ~40 nm.

Zeolite Y Seed Layers. Zeolite Y seed layers were deposited on the alumina supports using a dip-coating method described by White et al.[35] The sub-micron zeolite Y dip-coating solution was prepared by dispersing 100 mg of the dried, calcined zeolite Y in 20 mL of water, using 2 hours of sonication. The 5 mg/mL zeolite suspension was then screened using a 20 micron nylon mesh to remove larger particulates. During dip-coating, the substrate was brought in contact with 16 mL of the screened zeolite suspension in a watch glass at a speed of 0.01 m/s. The seeded alumina was dried overnight in a vacuum oven at room temperature.

Zeolite Y Membranes. Two different solutions were utilized to convert the supported zeolite seed layers into membranes by hydrothermal secondary growth. Their compositions were adapted from previous reports of zeolite Y membrane synthesis.[32,33,36-38]

Composition A, which did not contain a structure directing agent (SDA), was an opaque gel with a molar composition of $17Na_2O:1Al_2O_3:12.80SiO_2:975H_2O$. This mixture was prepared by mixing 85.24 g water, 2.208 g $Al(OH)_3$, and 7.29 g NaOH, which was then added to 13.85 g Ludox SM-30 colloidal silica with vigorous stirring. Upon mixing, a moderately viscous gel is formed, which is then aged while stirring for 4 hours. The alumina supported zeolite seed layers were placed face up in a 125 mL Teflon-lined Parr digestion vessel at a 45° angle in composition A solution, filled to 80% of total vessel volume. The vessel was heated using static conditions at 363° K for 8 hours prior to quenching in cold water. Each membrane was then washed well with water and allowed to dry overnight at room temperature.

Composition B representing this invention was a aqueous solution containing TMA hydroxide as an SDA, Composition B having the same chemical composition as the crystal-growing composition used for the synthesis of sub-micron zeolite Y seed crystallites described above. In a 250 mL Nalgene polypropylene bottle, the seeded supports were placed face up at a 45° angle using pieces of inert Teflon and then tightly sealed. Secondary growth was carried out for 7 days at 373° K, prior to rinsing and drying the supported membrane.

Characterization Techniques

The phase composition of zeolite materials and membranes was determined with a Bruker D8 X-ray diffractometer using nickel-filtered CuK$\alpha$ ($\lambda$=1.5405 Å) radiation. The zeolite membrane surface morphology was investigated by scanning electron microscopy (SEM) (JEOL JSM-5500, JEOL, Tokyo, Japan and Sirion FEG, FEI Company, US) on gold-coated specimens. In addition, the seed layer and membrane thicknesses were investigated by SEM of fracture cross-sections of the supported membrane structure. Diffuse reflectance infrared spectra (DRIFTS) were collected on zeolite Y powders (3 wt % in KBr) using a Perkin-Elmer infrared spectrometer (2 $cm^{-1}$ resolution) equipped with a Pike Technologies diffuse reflectance attachment. Elevated temperature DRIFT measurements were carried out from 298° K to 423° K in a sealed, Pike Technologies heat cell with a ramp rate 5 K/min under a constant $N_2$ flow with spectra collected every two minutes.

Separation Measurements

For the permeation measurements, the membranes were mounted in stainless steel cells with Viton O-ring seals. Single gas permeation measurements were carried out in the non-stationary dead-end mode. In this method, the feed gas is held at a constant pressure and allowed to permeate through the membrane into a pre-evacuated, closed vessel fitted with a pressure monitor. The supported membranes were evacuated at 423° K for 24 hours prior to introduction of the permeate gas. All measurements were carried out at a constant feed pressure of 207 kPa with $CO_2$ and $N_2$ at either 303° K, 353° K or 403° K. The limit of detection for this measurement was found to be $3.0 \times 10^{-9}$ mol/($m^2$ s Pa).

Mixed gas separation measurements were carried out using the setup shown in FIG. 6. The supported membranes were heated in the permeation cells at 423° K overnight while a dry 50/50 $CO_2/N_2$ mixture was maintained at the feed side to accelerate the removal of water from the membrane. The measurements were started by adjusting the temperature to either 403° K, 353° K or 303° K, using a combined feed flow rate of 100 sccm, and controlling the total feed pressure at 138 . . . 207 kPa. Helium was used as the permeate sweep gas at 200 sccm and atmospheric pressure. Feed and permeate gas compositions were sampled with a Varian Micro-GC gas chromatograph. The separation properties of the two zeolite Y membrane types were expressed in terms of the true selectivity (α) between $CO_2$ and $N_2$ ($\alpha_{CO_2,N_2}$), defined in eq. 1.

$$\alpha_{CO_2,N_2} = \frac{(\% \, CO_2^p)/(\% \, N_2^p)}{(\% \, CO_2^f)/(\% \, N_2^f)} \quad (1)$$

Due to detection limits of the GC for $N_2$, very high separation factors had to be expressed as α>550.

Membrane Synthesis and Characterization

Figure 2:
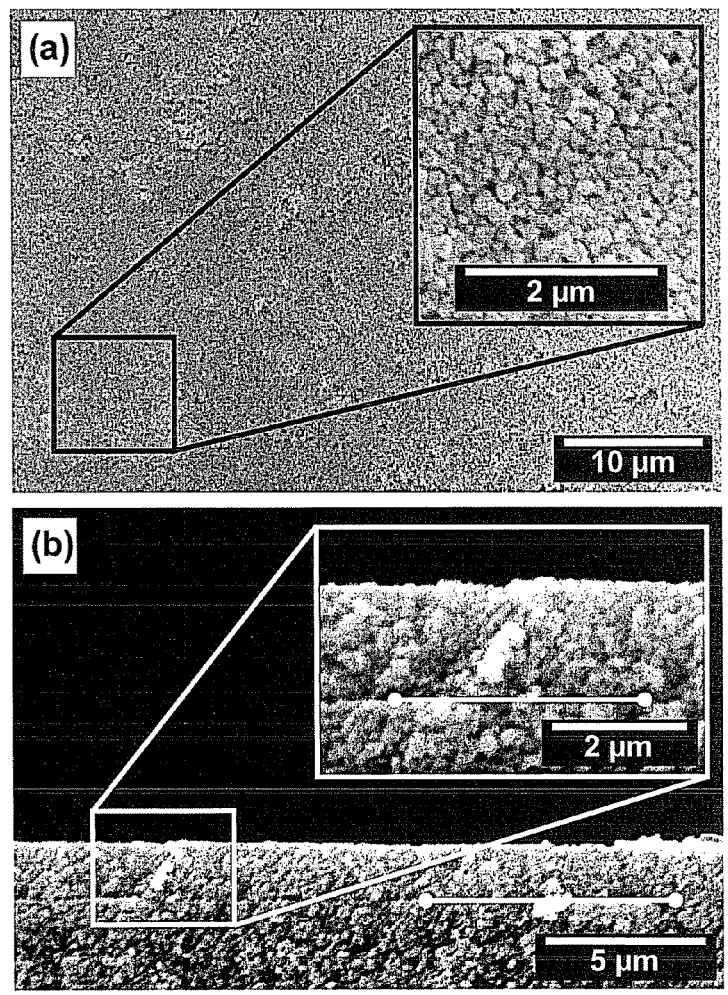
FIGS. 2(a) and 2(b) are scanning electron microscope (SEM) images of (a) top view and (b) cross-section of the seeded porous support illustrated in FIG. 1 (b)

The powder X-ray diffraction pattern of the calcined, sub-micron seed crystals shown in FIG. 1(a) confirms the formation of zeolite Y, along with a small amount of zeolite A (marked by an arrow) estimated at <5% based on the comparison of the (111) intensities). Besides the zeolite A and the alumina peaks marked by asterisks, all of the other peaks are due to zeolite Y. The crystal size was 80-200 nm, as determined by dynamic light scattering and confirmed by SEM. Stable colloidal suspensions of these crystals could be prepared in the absence of any dispersants or polymers, and were used for dip-coating the macro-porous alumina supports. The XRD pattern of a supported zeolite Y seed layer is shown in FIG. 1(b) (prepared using a 5 mg/mL dipping solution) and the SEM top view is shown in FIG. 2(a). The higher resolution inset in FIG. 2(a) shows a rather porous, heterogeneous packing morphology within the seed layer. This is ascribed to the polydispersity in zeolite particle size and the presence of zeolite A impurities (of cubic morphology). The SEM cross-section in FIG. 2(b) shows the presence of a ~1.6 μm thick seed layer.

Figure 3:
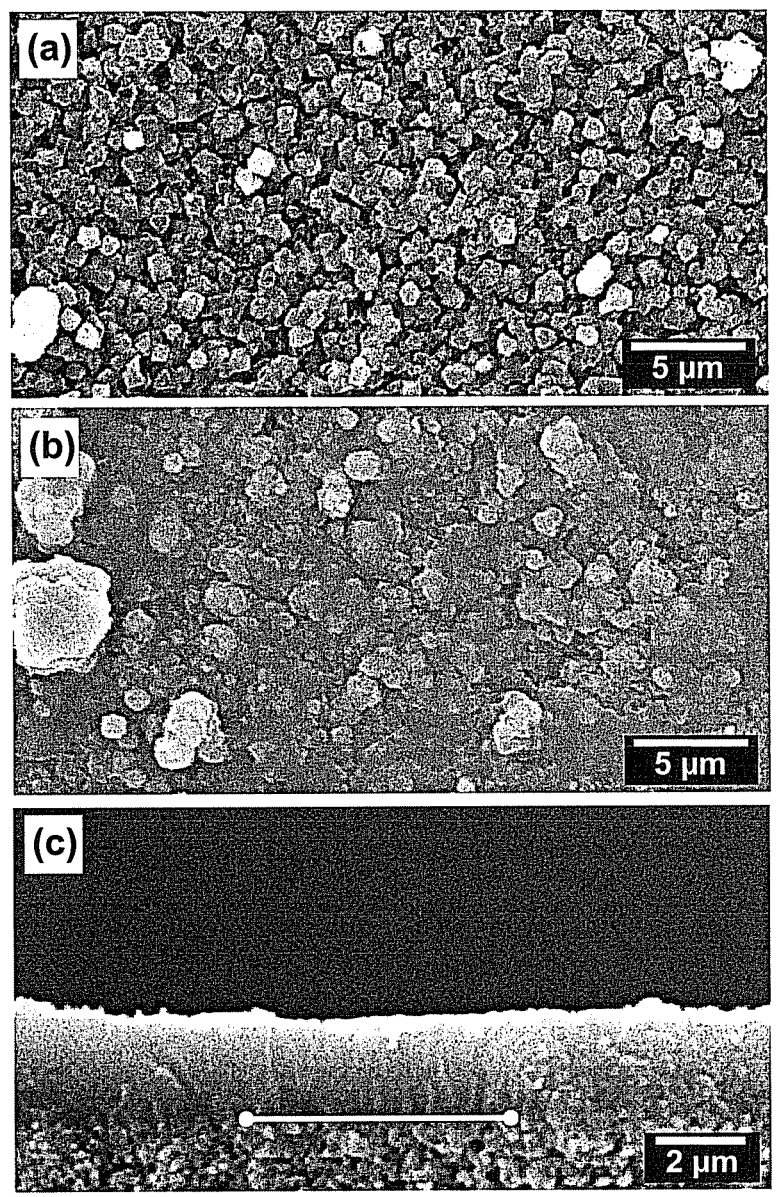
FIGS. 3(a), 3(b) and 3(c) are scanning electron microscope (SEM) images of (a) a top view of the supported zeolite Y membrane illustrated in FIG. 1 (c) after one eight hour secondary zeolite growing session, (b) a top view this same supported zeolite Y membrane after a second eight hour secondary zeolite growing session, and (c) a cross-section of the supported zeolite Y membrane of FIG. 3(b)

The seed layers were converted into zeolite Y membranes using composition A or B described above. These growth solutions were chosen because of the time differences it takes for crystallization to occur, with composition A being about 10 times faster than composition B. Growth was carried out in composition A for 8 hours at 363° K. FIG. 3(a) shows a top-view of the resulting membrane, with void spaces between neighboring particles, which indicates that the membrane was not yet continuous. Hence, the membrane was placed in a fresh composition A solution for 8 more hours, and the top view of the ensuing membrane in FIG. 3(b) suggests that membrane continuity had improved. The SEM cross-section in FIG. 3(c) shows that membrane thickness is 2-2.5 μm after two consecutive secondary growth procedures. The XRD pattern shown in FIG. 1(c) suggests the zeolite Y crystal structure.

Composition B results in slower growth of zeolite Y. During seven days of growth at 373° K, the solution became turbid after 4 days, and a precipitate formed after the sixth day. SEM cross-sectional and top-view images of the composition B membrane are provided in FIGS. 4(a)-(d). This shows that the cross-section is divided into three layers. The top and middle layer (a and b, respectively) were found to be porous with a combined thickness of 25 μm. However, as seen in FIG. 4(c), there is a dense layer directly present on the alumina support with a thickness varying between 350-600 nm. The SEM top-view in FIG. 4(d) confirms the presence of the porous zeolite layer shown in FIGS. 4(a)-(c). Powder XRD in FIG. 1(d) shows that the membrane is primarily zeolite Y.

Further insight into the mechanism of the membrane formation in composition B was obtained in an experiment with smaller (25-50 nm) zeolite Y seeds. These nanocrystals were dispersed in aqueous 1.5 wt % polyethyleneimine (PEI), with a concentration of 3.2 mg/mL. A representative seed layer formed by dip-coating is shown in FIG. 5(a), with a seed layer thickness of 350-375 nm. After secondary growth in composition B for four days, the SEM data shown in FIG. 5(b) indicated that no membrane is formed on the alumina support, but instead, a random deposition of sub-micron zeolite Y and larger zeolite A crystallites. The SEM top-view in FIG. 5(c) also indicates the incomplete formation of a membrane based on the still visible grains of the alumina support. This shows that, if the zeolite Y seed crystals are too small based on the chemistries of the particular seed crystals and crystal-growing composition used, no zeolite Y membrane will be produced due to the complete dissolution of the seed crystals before the membrane can form.

Gas Separation Properties

For each membrane type formed with compositions A and B (FIGS. 3(c) and 4(c)), 2 to 3 samples were analyzed by single gas permeation and gas separation measurements using the apparatus shown in FIG. 6, with similar results. The data presented here is from the best performing membrane of each type. For the as-synthesized membranes that were water-saturated, no single gas $CO_2$ or $N_2$ permeation could be detected; however, permeation was observed after heating the membranes overnight at 423° K. The single gas permeance results are shown in Table 1 below. As can be seen from this table, $f_{CO_2,B}^s$ $f_{CO_2,B}^s$ was 25-40 times greater than $f_{CO_2,A}^s$, $f_{CO_2,A}^s$; $f_{N_2}^s$ $f_{N_2}^s$ was similar for both membranes and near the detection limit. For membrane B, permselectivities ($\alpha_{CO_2,N_2}^s$) of 18 . . . 30, were obtained. The permselectivities for membrane A were very high but their exact value could not be determined due to detection limitations for $f_{N_2,A}^s$.

The $CO_2$ permeability (k) for composition A membranes, having thicknesses of 2 . . . 2.5 μm, was established to be 0.8 . . . $1 \times 10^{-14}$ mol/(m s Pa) at 303° K. At the same temperature, the $CO_2$ permeability for composition B membranes (350 . . . 600 nm thick, ignoring the top porous layer) was determined to be 3 . . . $6 \times 10^{-14}$ mol/(m s Pa). Due to the fact that only one feed pressure was utilized for these single gas measurements, no pressure dependent data is reported.

Prior to the mixed gas separation experiments, the membranes were heated to 423° K. The actual measurements were carried out at temperatures of 303° K to 403° K at feed pressures of 207 and 138 kPa for membranes A and B, respectively. The $\alpha_{CO_2,N_2}$ data are summarized in the following Table 2. As can be seen from this table, for composition B membranes, $\alpha_{CO_2,N_2}$ decreases with T, which has been previously demonstrated.[8-10,14] Such an effect could not be established for composition A membranes since at all temperatures, $\alpha_{CO_2,N_2}$>550. Membrane B showed the highest $\alpha_{CO_2,N_2}$>500 at T=303° K and even at T=403° K, $\alpha_{CO_2,N_2}$>40 was observed.

The concentration and decomposition of intrazeolitic TMA in composition B membranes upon heating was examined to establish its fate upon treatment at 423° K prior to the separation measurements. FIGS. 7(a) and 7(b) show infrared spectra collected on TMA-containing zeolite Y powder at temperatures ranging from 298° K to 423° K for varying times. The bands below 1200 cm$^{-1}$ arise from the zeolite. Even after two hours at 423° K, minimal changes in intensities were observed for the bands corresponding to the TMA cations at 1405 (combination mode 951+457 cm$^1$), 1422 ($CH_3$ umbrella bending), 1488 ($CH_3$ asymmetric bending) and 3013 ($CH_3$ asymmetric stretch) cm$^{-1}$,[27] although the bands due to water at 1635 and 3400 cm$^{-1}$ show a significant decrease. Elemental analysis on zeolite seed powders showed a carbon to nitrogen ratio (C/N) of 3.9 in untreated TMA-containing zeolite Y. That ratio remained the same after heating at 423° K for 4 days in flowing $N_2$. Thus, both the IR and elemental analysis confirm that TMA undergoes minimal decomposition when the zeolite was heated up to 423° K for extended periods of time. Therefore, it is believed that the TMA was still present in membranes B during the gas separation experiments. The C, N analysis also suggests a loading of 24 TMA molecules per unit cell. Assuming that all TMA molecules are in the supercage, TMA occupies ~25% of the supercage volume based on a TMA size of 0.66 nm.

Discussion

Membrane Formation

Figure 4:
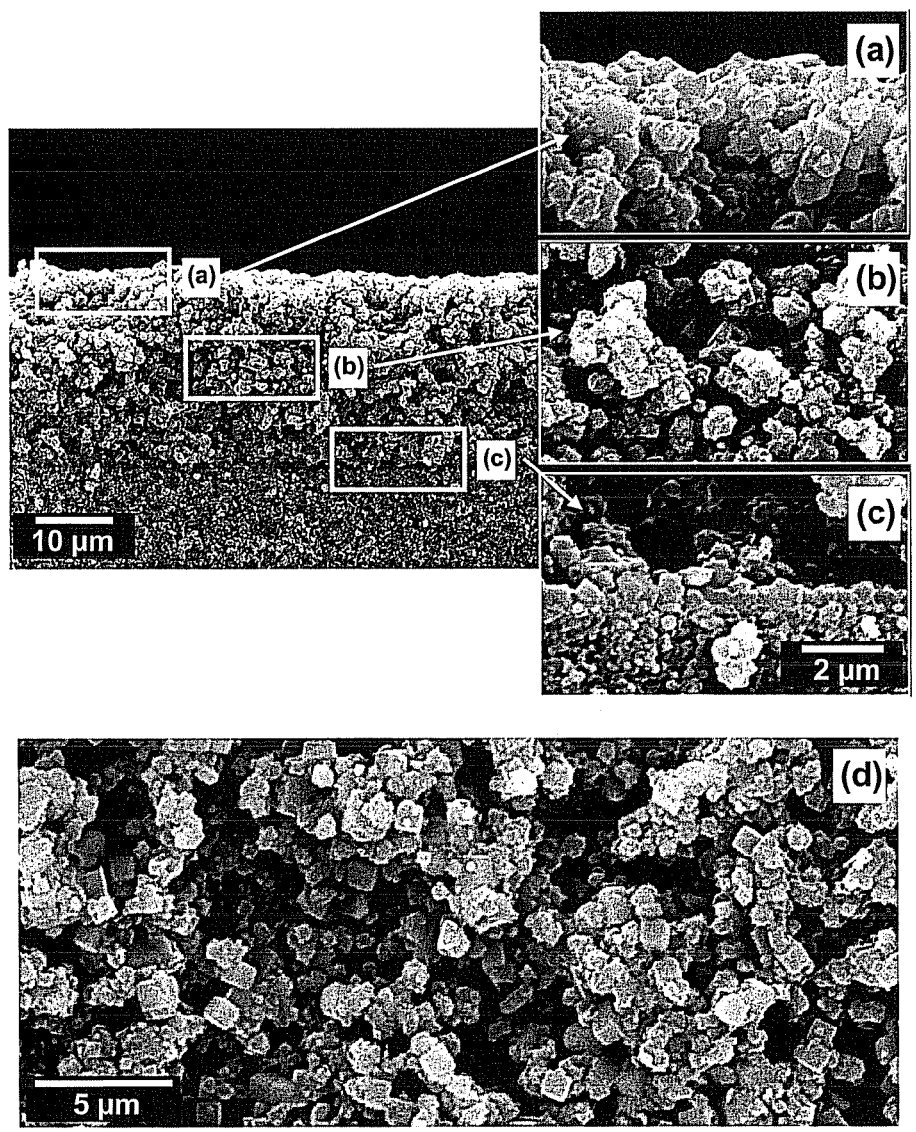
FIGS. 4(a), 4(b) and 4(c) are scanning electron microscope (SEM) images of three different cross-sections of the inventive supported zeolite Y membrane illustrated in FIG. 1 (d), while FIG. 4 (d) is a top view of this inventive supported zeolite Y membrane.
Figure 5:
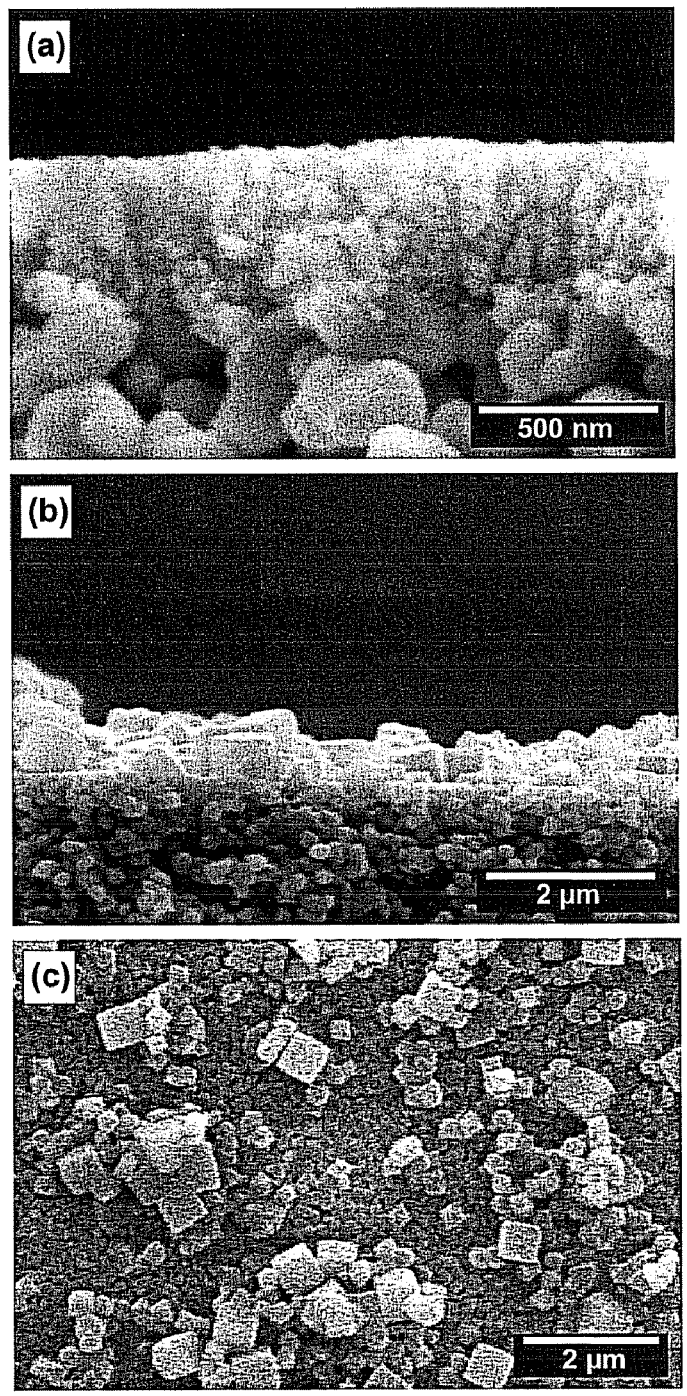
FIG. 5 are SEM images illustrating the importance of choosing seed crystals having a large enough particle size, FIG. 5 showing that no zeolite Y membrane was formed in a comparative example in which the particle size of the particular seed crystals used was too small.

For membranes made from Composition B, two sets of seed crystals were examined, and the SEM images are shown in FIGS. 4 and 5. When the zeolite Y seed crystals were too small, i.e., less than about 50 nm in particle size in the particular embodiment shown, no membrane was formed. See, FIGS. 5(b) and 5(c). Since the reaction vessel was not agitated or stirred during secondary growth, the zeolite seed crystals were not being physically lodged from the support surface. This leads to the conclusion that zeolite dissolution is occurring during the secondary growth process. With the sub-micron zeolite Y seed crystals (~80 nm to ~200 nm in the embodiment shown), dissolution does occurs but not as rapidly and to full completion as is the case for the smaller (<50 nm) seed crystals. Such dissolution phenomena has been also been observed for zeolite A, TS-1, MFI and ZSM-5.[28-31] For both nano and sub-micron seeds used in synthesis of composition B membranes, dissolution of the seed crystals occurs in the initial stage. In the case of the sub-micron seed layer, partial dissolution is followed by secondary growth of the remaining zeolite Y nuclei at the alumina interface. The thick 25 μm porous zeolite layer is likely formed from secondary nuclei that are generated further away from the surface at lower concentrations. In contrast, the growth of composition A membrane occurs in a much shorter time by rapid intergrowth within the seed layer. This does not allow the seed crystals enough time to dissolve before being converted into a dense membrane. Efforts were made to vary the growth times and sample orientation to get rid of the thick porous layer in composition B membranes, but these led to discontinuous membranes and defects.

Membrane Transport

Although the eventual membrane types (i.e., membranes A and B) are considerably different in their membrane microstructure and morphology, their $CO_2$ transport properties are quite similar when the thickness of the active membrane is taken into consideration. In this regard, the porous layers above membrane B (i.e., regions a and b in FIGS. 4(a) and 4(b)) are not contributing to the separation because of the high interporosity between these crystal, so that gas molecules are not passing through the zeolite but rather through these large pore spaces and pinholes. Rather, these regions just act to build up a thick stationary layer of the gases and possibly influence the separation negatively. On the other hand, the $N_2$ permeability of membrane A is one order of magnitude less than that of membrane B. Different gas transport mechanisms for the two gases can explain these observations. For $CO_2$, transport through membrane is thought to occur by an activated surface diffusion mechanism.[10] For nitrogen, the mechanism is considered to be primarily ballistic.

Non-stationary single gas permeation experiments on defective and non-continuous membranes showed f$^s$ approaching the support permeance ($10^{-7}$ mol/($m^2$ s Pa)). For the as-grown membranes presented here, no detectable $CO_2$ or $N_2$ was observed at a feed pressure of 207 kPa after 24 hours, which confirms that the membranes were fully continuous. Removal of the intrazeolitic water by heat treatment resulted in the membrane transport properties shown in Table 1. Composition B membranes had a $CO_2$ flux that was higher by an order of magnitude or more as compared to composition A membranes. The permselectivities for membrane B already indicate very high intrinsic selectivities, as shown in Table 1. The $CO_2$ permeance of membrane B ($1\times10^{-7}$ mol/($m^2$ s Pa)) approached that of the bare alumina support (3 ... $4\times10^{-7}$ mol/($m^2$ s Pa)).

The temperature effect on the $CO_2/N_2$ selectivity for membranes A and B is consistent with previous reports, in which the highest selectivities were obtained at temperatures <323° K.[8-10,14] The relation between $\alpha_{CO_2,N_2}$ and $\alpha_{CO_2,N_2}^s$ depends on the average occupation, 0<θ<1, of the micropores in the membrane.[13] For the proposed membranes and conditions, $\theta_{CO_2}$>0.5 and $\theta_{N_2}$<0.1 so that $\alpha_{CO_2,N_2}$>>$\alpha_{CO_2,N_2}^s$ in what was previously described as type II separation. The data presented for membrane B in Tables 1 and 2 show strong evidence for type II separation based on the fact that $\alpha CO_{2,N_2}$ is much higher than $\alpha_{CO_2,N_2}^s$ determined from the single gas permeances. The differences between $\alpha_{CO_2,N_2}$ and $\alpha_{CO_2,N_2}^s$ at temperatures ≦353° K are even more significant (>60) when compared to the experimental values at 403° K.

Comparison to Literature

Table 3 shows a comparison between permeance and selectivity of the zeolite Y membranes in this document with those reported in the literature. The membranes in Table 3 have different support types, Si/Al ratios, as well as thickness (0.7-60 μm), all of which can greatly affect the overall membrane performance. At temperatures below 323° K, the reported CO2 permeances are 1.5 ... $5\times10^{-7}$ mol/(m2 s Pa), with $\alpha_{CO_2,N_2}$=6-54. The single most selective membrane ($\alpha_{CO_2,N_2}$~100 at 303K) in Table 3 is approximately 10 μm thick and has a $f_{CO_2}$ of 2 ... $3\times10^{-8}$ mol/(m2 s Pa) 23. The least selective membrane in Table 3 has a $\alpha_{CO_2,N_2}$=6 at 323° K with thickness <1 μm thick, and a permeance of $3.5\times10^{-7}$ mol/($m^2$ s Pa).

The $\alpha_{CO_2,N_2}$ for membrane A (>550) far exceeds that for any existing zeolite Y membrane below 323° K. Even at 403° K, membrane A was found to have a higher selectivity than those reported earlier at lower temperatures. However, the $f_{CO_2,A}$ of composition A membranes is 20-200× less than that of the published membranes.

Membrane B also has better $CO_2/N_2$ separation performance when compared to the membranes in Table 3, with selectivities as high as 500. Although the selectivity decreases with increasing temperature for membrane B, $\alpha_{CO_2,N_2}$ is still >40 at 403° K, with $CO_2$ permeances similar to the published membranes. These results show the versatility of using membrane B over a wide range of experimental temperatures, based on the fact that the separation between $CO_2$ and $N_2$ typically diminishes above 353° K for zeolite Y membranes, as shown in Table 3.

However, when comparing composition B membrane to those in Table 3, there are several reported membranes that are more permeable to $CO_2$ (2-15 times). Those membranes that had $f_{CO_2} < 1 \times 10^{-7}$ mol/(m² s Pa) at <323K, were reported as having $\alpha_{CO_2,N_2} < 35$. Membrane B demonstrates better selectivities (>500), but lower permeances. For those membranes in Table 3 that have $\alpha_{CO_2,N_2} > 35$, the $CO_2$ permeances are either the same or less than those for the membrane B.

CONCLUSIONS

Sub-micron zeolite Y seeds were dip-coated onto macroporous alumina supports and grown into homogeneous, dense membranes. Two different secondary growth solutions were utilized, with fast (composition A) and slow growth (composition B) characteristics. The rapid growth procedure led to uniform zeolite membranes of 2 μm thickness, with very high selectivity for $CO_2$ separation from $N_2$, but with low permeance. The slower growth procedure resulted in membranes that were 25 μm thick, with most of the membrane being highly porous, in addition to a dense 350 . . . 600 nm thick continuous membrane on the support. This thin layer determined the overall transport properties, which resulted in a substantially higher permeance and may be of practical use in fabricating membranes capable of separating $CO_2$ from $N_2$ and other gases over a wider range of temperatures and pressures. Membranes could not be formed when starting from nanometer sized seeds (i.e., <50 nm in the particular embodiments shown). Hence, it appears that avoiding seed crystals which are too small is important in membrane growth.

REFERENCES (1) Dutta, P. K.; Payra, P. In *Handbook of Zeolite Science and Technology*; Auerbach, S. M., Carrado, K. A. and Dutta, P. K., Eds.; Marcel Dekker, Inc.: New York, 2003; pp 1.
(2) Bernardo, P.; Algieri, C.; Barbieri, G.; Drioli, E. *Desalination* 2006, 200, 702.
(3) Kim, Y.; Das, A.; Zhang, H.; Dutta, P. K. *J. Phys. Chem. B* 2005, 109, 6929.
(4) Coronas, J.; Noble, R. D.; Falconer, J. L. *Ind. Eng. Chem. Res.* 1998, 37, 166.
(5) Flanders, C. L.; Tuan, V. A.; Noble, R. D.; Falconer, J. L. *J. Membr. Sci.* 2000, 176, 43.
(6) Gump, C. J.; Noble, R. D.; Falconer, J. L. *Ind. Eng. Chem. Res.* 1999, 38, 2775.
(7) Seike, T.; Matsuda, M.; Miyake, M. *J. Mater. Chem.* 2002, 12, 366.
(8) Kusakabe, K.; Kuroda, T.; Morooka, S. *J. Membr. Sci.* 1998, 148, 13-23.
(9) Hasegawa, Y.; Kusakabe, K.; Morooka, S. *Chem. Eng. Sci.* 2001, 56, 4273-4281.
(10) Kusakabe, K.; Kuroda, T.; Uchino, K.; Hasegawa, Y.; Morooka, S. *AIChE J.* 1999, 45, 1220.
(11) McLeary, E. E.; Jansen, J. C.; Kapteijn, F. *Microporous Mesoporous Mater.* 2006, 90, 198.
(12) Koros, W. J.; Ma, Y. H.; Shimidzu, T. *Pure. Appl. Chem.* 1996, 68, 1479.
(13) Verweij, H. *J. Mater. Sci.* 2003, 38, 4677.
(14) Kusakabe, K.; Kuroda, T.; Murata, A.; Morooka, S. *Ind. Eng. Chem. Res.* 1997, 36, 649.
(15) Hasegawa, Y.; Watanabe, K.; Kusakabe, K.; Morooka, S. *Sep. Purif. Technol.* 2001, 22-23, 319.
(16) Hasegawa, Y.; Watanabe, K.; Kusakabe, K.; Morooka, S. *J. Membr. Sci.* 2002, 208, 415.
(17) Gu, X.; Dong, J.; Nenoff, T. M. *Ind. Eng. Chem. Res.* 2005, 44, 937.
(18) Cheng, Z.; Gao, E.; Wan, H. *Chem. Commun.* 2004, 1718.
(19) Guillou, F.; Rouleau, L.; Pirngruber, G.; Valtchev, V. *Microporous Mesoporous Mater.* 2009, 119, 1.
(20) Kumakiri, I.; Yamaguchi, T.; Nakao, S. *Ind. Eng. Chem. Res.* 1999, 38, 4682.
(21) Holmberg, B. A.; Wang, H.; Norbeck, J. M.; Yan, Y. *Microporous Mesoporous Mater.* 2003, 59, 13.
(22) Nair, S.; Tsapatsis, M. In *Handbook of Zeolite Science and Technology*; Auerbach, S. M., Carrado, K. A. and Dutta, P. K., Eds.; Marcel Dekker: 2003.
(23) Li, Q. H.; Creaser, D.; Sterte, J. *Chem. Mater.* 2002, 14, 1319.
(24) Mintova, S.; Olson, N. H.; Bein, T. *Angew. Chem. Int. Ed.* 1999, 38, 3201.
(25) Kuzniatsova, T. A.; Mottern, M. L.; Chiu, W. V.; Kim, Y.; Dutta, P. K.; Verweij, H. *Adv. Funct. Mater.* 2008, 18, 952.
(26) Hedlund, J.; Korelskiy, D.; Sandstrom, L.; Lindmark, J. *J. Membr. Sci.* 2009, 345, 276.
(27) Spinner, E. *Spectrochim. Acta, Part A* 2003, 59, 1441.
(28) Matsukata, M.; Sawamura, K.; Shirai, T.; Takada, M.; Sekine, Y.; Kikuchi, E. *J. Membr. Sci.* 2008, 316, 18.
(29) Uemiya, S.; Tanigawa, A.; Koike, T.; Sasaki, Y.; Ban, T.; Ohya, Y.; Yoshiie, R.; Nishimura, M.; Yamamoto, N.; Yogo, K.; Yamada, K. *J. Porous Mater.* 2007, 15, 405.
(30) Qiva, F.; Wanga, X.; Zhanga, X.; Liva, H.; Liva, S.; Yeungb, K. L. *Chem. Eng. J.* 2009, 147, 316.
(31) Li, S.; Li, Z.; Bozhilov, K. N.; Chen, Z.; Yon, Y. *J. Am. Chem. Soc.* 2004, 126, 10732.
(32) Dutta, P. K.; Kim, Y. *J. Phys. Chem. C* 2007, 111, 10575.
(33) Kim, Y.; Dutta, P. K. *Res. Chem. Intermed.* 2004, 30, 147.
(34) Shqau, K.; Mottern, M. L.; Yu, D.; Verweij, H. *J. Am. Ceram. Soc.* 2006, 89, 1790.
(35) White, J. C.; Dutta, P. K.; Verweij, H.; Shqau, K. *Microporous Mesoporous Mater.* 2008, 115, 389.
(36) Kusakabe, K.; Kuroda, T.; Morooka, S. *J. Membr. Sci.* 1998, 148, 13-23.
(37) Hasegawa, Y.; Kusakabe, K.; Morooka, S. *Chem. Eng. Sci.* 2001, 56, 4273-4281.
(38) Kusakabe, K.; Kuroda, T.; Uchino, K.; Hasegawa, Y.; Morooka, S. *AIChE J.* 1999, 45, 1220.

TABLE 1

Summary of the single gas permeances (f³) for $CO_2$ and $N_2$ at 207 kPa, as well as the permselectivities ($\alpha_{CO_2,N_2}^s$) and $CO_2$ permeabilities (k) for composition A and B membranes.

| Test Temperature | Composition A Membranes | | | | Composition B Membranes | | | |
|---|---|---|---|---|---|---|---|---|
| | Permeance (mol/m² s Pa) | | | $CO_2$ Permeability (mol/m s Pa) (*) | Permeance (mol/m² s Pa) | | | $CO_2$ Permeability (mol/m s Pa) (†) |
| (K) | $CO_2$ | $N_2$ | $\alpha_{(CO_2,N_2)}^s$ | 0.8 . . . 1 × 10⁻¹⁴ | $CO_2$ | $N_2$ | $\alpha_{(CO_2,N_2)}^s$ | 3 . . . 6 × 10⁻¹⁴ |
| 403 | 4.1 × 10⁻⁹ | <3.0 × 10⁻⁹ | ND | | 1.1 × 10⁻⁷ | 4.4 × 10⁻⁹ | 25.0 | |
| 353 | 3.3 × 10⁻⁹ | <3.0 × 10⁻⁹ | ND | | 1.3 × 10⁻⁷ | 4.4 × 10⁻⁹ | 29.5 | |
| 303 | 3.9 × 10⁻⁹ | <3.0 × 10⁻⁹ | ND | | 9.6 × 10⁻⁸ | 5.1 × 10⁻⁹ | 18.8 | |

(*) Membranes with thicknesses ranging from 2 . . . 2.5 μm
(†) Membranes with thicknesses ranging from 0.35 . . . 0.6 μm

TABLE 2

Summary of $\alpha_{CO_2, N_2}$ for composition A and B membranes at various temperatures (retentate feed pressures are noted in table).

| Test Temperature (K) | Composition A Membranes $\alpha_{(CO_2, N_2)}$ Retentate Pressure 207 kPa | Composition B Membranes $\alpha_{(CO_2, N_2)}$ Retentate Pressure 138 kPa |
|---|---|---|
| 303 | >550 | 503 |
| 353 | >550 | 94 |
| 403 | >550 | 41 |

TABLE 3

Comparison of published reported performances of FAU-type membranes in $CO_2/N_2$ separations versus membranes in this study.

| Reference | Membrane Area (cm$^2$) | Support Type/Shape | Membrane Thickness (μm) | Retentate Feed Pressure (kPa) | Test Temperature (K) | Permeance ($10^{-7}$ mol/m$^2$ s Pa) $CO_2$ | $N_2$ | $\alpha_{CO_2/N_2}$ |
|---|---|---|---|---|---|---|---|---|
| [14] | 17.6 | α-alumina tube | 10 | 101 | 303 | 0.28 (2) | 0.1 | 100 (2) |
| [8] | 17.6 | α-alumina tube | 10 | 101 | 313 | 4.1 (1) | 0.09 | 46 (1) |
| [10] | 17.6 | α-alumina tube | 10 | 101 | 308 | 13 (1) | 0.44 | 30 (1) |
| [9] | 0.8 | α-alumina tube | 5 | 101 | 308 | 15 (1) | 0.47 | 32 (1) |
| [16] | 13.2 | α-alumina tube | 3 | 101 | 308 | 11 (1) | 0.3 | 37 (1) |
| [17] | 6.6 | α-alumina disk | 4 | 86 | 323 | 0.39 (1) | 0.02 | 20 (1) |
| [19] | 24 | α-alumina tube | 10 | 130 | 323 | 3.48 (2) | 0.28 | 5.7 (2) |
|  | 24 | α-alumina tube | 10 | 130 | 343 | 3.58 (2) | 0.46 | 4.2 (2) |
| [15] | 13.2 | α-alumina tube | 3 | 101 | 308 | 8.6 (1) | 0.45 | 19 (1) |
| [7] | 1 | Peeled from SS plate | 60 | 101 | 298 | 5.4 (1) | 0.27 | 20 (1) |
| [18] | 4.5 | α-alumina disk | 50 | — | 298 | 1.5 (1) | 0.028 | 54 (1) |
|  | 4.5 | α-alumina disk | 50 | — | 373 | 2.0 (1) | 0.08 | 25 (1) |
| Membrane A | 7 | α-alumina disk | 1.9-2.1 | 207 | 303 | 0.039 (2) | 0.029 | >550 (2) |
| Membrane A | 7 | α-alumina disk | 1.9-2.1 | 207 | 403 | 0.041 (2) | 0.03 | >550 (2) |
| Membrane B | 7 | α-alumina disk | 0.5-0.8 | 138 | 303 | 0.96 (2) | 0.051 | 503 (2) |
| Membrane B | 7 | α-alumina disk | 0.5-0.8 | 138 | 403 | 1.1 (2) | 0.044 | 41 (2) |

For all experiments, the permeate pressure was maintained at atmospheric pressure.
(1) Permeances and selectivity determined from mixed gas separation experiments
(2) Permeances determined by single gas permeation experiments; selectivity determined from mixed gas separation experiments Although only a few embodiments of this invention are described above, it should be appreciated that many modifications can be made without departing from the spirit and scope of the invention. All such modifications are intended to be included within the scope of this invention, which is to be limited only by the following claims:

The invention claimed is:

1. A process for producing a supported zeolite Y membrane for use in a gas separation procedure in which zeolite Y seed crystals previously deposited onto a porous support are grown into a coherent zeolite Y membrane by contact with a zeolite-growing aqueous composition and the coherent zeolite Y membrane so formed is then dried,
wherein the zeolite-growing aqueous composition contains a structure directing agent capable of promoting the formation of zeolite Y, and further
wherein drying of the coherent zeolite Y membrane is done under conditions which cause at least about 70% of the structure directing agent that is present in the membrane when formed to remain in the membrane after drying is completed.

2. The process of claim 1, wherein the structure directing agent is a tetramethylammonium compound.

3. The process of claim 2, wherein tetramethylammonium compound contains an anion selected from the group consisting of OH$^-$, Br$^-$, Cl$^-$ and F$^-$.

4. The process of claim 3, wherein at least about 80% of the structure directing agent that is present in the membrane when formed remains in the membrane after drying is completed.

5. The process of claim 4, wherein at least about 90% of the structure directing agent that is present in the membrane when formed remains in the membrane after drying is completed.

6. The process of claim 5, wherein substantially all of the structure directing agent that is present in the membrane when formed remains in the membrane after drying is completed.

7. The process of claim 1, wherein drying of the coherent zeolite Y membrane is done under conditions which cause at least about 80% of the structure directing agent that is present in the membrane when formed to remain in the membrane after drying is completed.

8. The process of claim 1, wherein drying of the coherent zeolite Y membrane is done under conditions which cause substantially all of the structure directing agent that is present in the membrane when formed to remain in the membrane after drying is completed.

9. A dried supported zeolite Y membrane for use in a gas separation procedure, the supported membrane comprising a porous support and a coherent zeolite Y membrane on the support, the membrane being produced by a seeding/secondary crystal growing process in which zeolite Y seed crystals previously deposited onto a porous support are grown into a coherent zeolite Y membrane by contact with a zeolite-growing aqueous composition and the coherent zeolite Y membrane so formed is then dried,
wherein the zeolite-growing aqueous composition contains a structure directing agent capable of promoting the formation of zeolite Y and further wherein drying of the coherent zeolite Y membrane is done under conditions which cause at least about 70% of the structure directing agent that is present in the membrane when formed to remain in the membrane after drying is completed.

10. The dried supported zeolite Y membrane of claim 9, wherein the structure directing agent is a tetramethylammonium compound.

11. The dried supported zeolite Y membrane of claim 10, wherein tetramethylammonium compound contains an anion selected from the group consisting of $OH^-$, $Br^-$, $Cl^-$ and $F^-$.

12. The dried supported zeolite Y membrane of claim 9, wherein at least about 80% of the structure directing agent that is present in the membrane when formed remains in the membrane after drying is completed.

13. The dried supported zeolite Y membrane of claim 12, wherein at least about 90% of the structure directing agent that is present in the membrane when formed remains in the membrane after drying is completed.

14. The dried supported zeolite Y membrane of claim 13, wherein substantially all of the structure directing agent that is present in the membrane when formed remains in the membrane after drying is completed.

15. A process for separating a gas mixture into its component parts comprising contacting the gas mixture with the dried supported zeolite Y membrane of claim 9.

16. The process of claim 15, wherein $CO_2$ is separated from a gas mixture containing at least $CO_2$ and $N_2$.

17. A process for separating a gas mixture into its component parts comprising contacting the gas mixture with the supported zeolite Y membrane of claim 12.

18. The process of claim 17, wherein $CO_2$ is separated from a gas mixture containing at least $CO_2$ and $N_2$.

19. A process for separating a gas mixture into its component parts comprising contacting the gas mixture with the supported zeolite Y membrane of claim 14.

20. The process of claim 19, wherein $CO_2$ is separated from a gas mixture containing at least $CO_2$ and $N_2$.

\* \* \* \* \*